(12) United States Patent
Loughmiller

(10) Patent No.: US 10,430,216 B1
(45) Date of Patent: Oct. 1, 2019

(54) VIRTUAL MACHINE AUTOMATED SELECTION

(71) Applicant: Scott Loughmiller, San Francisco, CA (US)

(72) Inventor: Scott Loughmiller, San Francisco, CA (US)

(73) Assignee: Scale Computing Inc, Indianapolis, IN (US)

( * ) Notice: Subject to any disclaimer, the term of this patent is extended or adjusted under 35 U.S.C. 154(b) by 42 days.

(21) Appl. No.: 13/841,748

(22) Filed: Mar. 15, 2013

Related U.S. Application Data

(60) Provisional application No. 61/692,666, filed on Aug. 23, 2012.

(51) Int. Cl.
*G06F 9/455* (2018.01)

(52) U.S. Cl.
CPC ................. *G06F 9/45533* (2013.01)

(58) Field of Classification Search
None
See application file for complete search history.

(56) References Cited

U.S. PATENT DOCUMENTS

| | | | |
|---|---|---|---|
| 5,758,124 A * | 5/1998 | Ogata | G06F 9/45537 703/27 |
| 5,761,669 A | 6/1998 | Montague et al. | |
| 6,023,706 A | 2/2000 | Schmuck et al. | |
| 6,085,244 A | 7/2000 | Wookey | |
| 6,275,898 B1 | 8/2001 | DeKoning et al. | |
| 6,675,258 B1 | 1/2004 | Bramhall et al. | |
| 6,775,824 B1 | 8/2004 | Osborne et al. | |
| 6,961,937 B2 | 11/2005 | Avvari et al. | |
| 6,968,382 B2 | 11/2005 | McBrearty et al. | |
| 6,981,102 B2 | 12/2005 | Beardsley et al. | |
| 7,165,189 B1 | 1/2007 | Lakkapragada et al. | |
| 7,343,587 B2 | 3/2008 | Moulden et al. | |
| 7,370,101 B1 | 5/2008 | Lakkapragada et al. | |
| 7,373,438 B1 | 5/2008 | DeBergalis et al. | |
| 7,409,497 B1 | 8/2008 | Kazar et al. | |
| 7,426,729 B2 | 9/2008 | Avvari et al. | |

(Continued)

FOREIGN PATENT DOCUMENTS

EP    2119612 A1 * 11/2009 ............ B60W 50/02

*Primary Examiner* — Diem K Cao

(57) ABSTRACT

Assigning virtual machines to physical devices in a cluster, without need for substantial operator decision-making or intervention. An operator console, coupled to the cluster, receives information from those physical devices about resource use by virtual machines. Each physical device reports virtual machines assigned thereto, and their resource usage. The console presents information regarding resource use by virtual machines, and presents a control panel to the operator, allowing manipulation of virtual machines and physical devices: starting or stopping virtual machines, moving virtual machines, adding or removing physical devices. The operator can create a new virtual machine, or can restart a paused or stopped virtual machine. The console determines a best physical device to host the new virtual machine, assigns the new virtual machine to that selected physical device, and starts or restarts the new virtual machine on the selected physical device, without substantial operator decision-making or intervention.

15 Claims, 3 Drawing Sheets

(56) References Cited

U.S. PATENT DOCUMENTS

| | | |
|---|---|---|
| 7,457,880 B1 | 11/2008 | Kim |
| 7,574,464 B2 | 8/2009 | Hitz et al. |
| 7,937,421 B2 | 5/2011 | Mikesell et al. |
| 7,991,969 B1 | 8/2011 | Chatterjee et al. |
| 8,112,527 B2* | 2/2012 | Kawato ..................... 709/226 |
| 8,458,717 B1* | 6/2013 | Keagy ................... G06F 8/63 |
| | | 718/104 |
| 9,223,606 B1* | 12/2015 | Vaidya ............... G06F 9/45558 |
| 9,621,651 B1* | 4/2017 | Ghemawat .......... H04L 67/1095 |
| 2002/0138559 A1 | 9/2002 | Ulrich et al. |
| 2004/0148138 A1 | 7/2004 | Garnett et al. |
| 2005/0246612 A1 | 11/2005 | Leis et al. |
| 2005/0273659 A1 | 12/2005 | Shaw |
| 2005/0278576 A1 | 12/2005 | Hekmatpour |
| 2006/0041780 A1 | 2/2006 | Budaya et al. |
| 2008/0021951 A1 | 1/2008 | Lurie et al. |
| 2009/0210527 A1* | 8/2009 | Kawato ..................... 709/224 |
| 2009/0327798 A1* | 12/2009 | D'Amato ................ G06F 3/062 |
| | | 714/4.1 |
| 2010/0250824 A1* | 9/2010 | Belay ............................. 711/6 |
| 2012/0054367 A1* | 3/2012 | Ramakrishnan ...... G06F 9/4856 |
| | | 709/242 |
| 2012/0166886 A1* | 6/2012 | Shankar ............. G06F 11/2028 |
| | | 714/43 |
| 2012/0239814 A1* | 9/2012 | Mueller ................ G06F 9/5061 |
| | | 709/226 |
| 2012/0284713 A1* | 11/2012 | Ostermeyer ........ G06F 17/5009 |
| | | 718/1 |
| 2012/0304168 A1* | 11/2012 | Raj Seeniraj ......... G06F 9/4445 |
| | | 718/1 |
| 2013/0067294 A1 | 3/2013 | Flynn et al. |
| 2013/0132531 A1* | 5/2013 | Koponen ............ H04L 41/0823 |
| | | 709/220 |
| 2013/0191827 A1* | 7/2013 | Ashok et al. ..................... 718/1 |
| 2013/0282994 A1* | 10/2013 | Wires ................... G06F 3/0604 |
| | | 711/158 |

\* cited by examiner

VIRTUAL MACHINE AUTOMATED SELECTION

CROSS-REFERENCE TO RELATED APPLICATIONS

Inventions described in this application can also be used in combination or conjunction, or otherwise, with techniques described in one or more of the following documents.

U.S. Provisional Patent Application 61/651,391, filed May 24, 2012, titled "Unified hypervisor and distributed fault-tolerant storage"; and U.S. Provisional Patent Application 61/692,662, filed Aug. 23, 2012, titled "Transferring virtual machines and resource localization in a distributed fault-tolerant system"; and U.S. Provisional Patent Application 61/692,660, filed Aug. 23, 2012, titled "Virtual machine resource display".

Each and every one of these documents is hereby incorporated by reference as if fully set forth herein. These documents are sometimes referred to herein as the "Incorporated Disclosures".

BACKGROUND

Field of the Disclosure

This application generally relates to virtual machine automated selection, and related matters.

Background of the Disclosure

Many enterprises centralize their information technology operations in data centers, which perform computing operations and maintain storage on behalf of the enterprise's personnel. In those data centers, application servers often perform computing operations, each of which is often executed within its own virtual machine (VM). Each virtual machine can include an emulation of a physical machine, which can be executed by a physical computing device. Storage requirements are often provided by storage servers, which maintain blocks of storage that can be accessed by application servers and other devices using a network storage protocol.

It sometimes occurs that it is desirable to execute more than one virtual machine on a physical computing device. For example, in a data center as described above, a physical computing device can provide a service, which remote users can call upon, in which that physical computing device executes one or more virtual machines as requested. In such cases, the physical computing device provides physical resources, and allocates them to a specific virtual machine. When allocating the physical resources of the physical device to the virtual machines, it sometimes occurs that the physical resources available to that physical device limit the number and size of the virtual machines that the physical device can execute. For example, it sometimes occurs that a physical device having 32 GiB of memory cannot execute more than four virtual machines, each requiring 8 GiB of memory.

It sometimes occurs that multiple physical machines are disposed in a cluster, in which those multiple physical machines can intercommunicate. In such cases, one or more virtual machines, when allocated to physical devices, can have the effect of overloading those physical devices with respect to other physical devices. This can have the effect of causing those overloaded physical devices to run more slowly than necessary, while more lightly loaded physical devices run more quickly and could take up some of that load. This can pose a problem when an operator is assigning virtual machines to physical devices, as that operator does not have a relatively convenient way of assigning new virtual machines to the physical devices to which they are best suited.

It sometimes occurs that when an operator is ready to assign a new virtual machine to a physical device, it would be convenient for that operator to have a relatively easy way to determine which physical device that virtual machine is best suited to. For example, when the operator assigns a new virtual machine to a physical device, that operator must select a particular physical device to host the virtual machine. This can pose a problem with the cluster presumes that each physical device operates independently, and the cluster involves providing methods for balancing or transferring load among multiple such physical devices.

Each of these examples, as well as other possible considerations, can cause difficulty in assigning new virtual machines to physical devices in a cluster, particularly when load-balancing and avoiding overloading of physical devices are important to the operator. For example, the operator of a cluster should take care that virtual machines are not assigned so that one or more of the physical devices are overloaded. Moreover, the operator of a cluster should take care that use of resources by virtual machines assigned to physical devices are relatively well balanced with respect to each other. Each of these might have a detrimental effect on the value of the cluster of physical devices and on assignment of virtual machines to those physical devices.

BRIEF SUMMARY OF THE DISCLOSURE

This application provides techniques for assigning virtual machines to physical devices in a cluster of physical devices, without need for substantial operator decision-making or intervention.

In one embodiment, an operator console is coupled to the cluster of physical devices, and receives information from those physical devices with respect to use of resources by virtual machines assigned to those physical devices. For example, each physical device can report a set of virtual machines assigned thereto, and an amount of physical memory assigned to each of those virtual machines. The operator console presents information to the operator regarding use of resources by virtual machines, in a natural and visible way that allows the operator to assess, relatively rapidly, use of resources by virtual machines assigned to those physical devices.

In one embodiment, the operator console presents a control panel to the operator, which allows the operator to manipulate virtual machines and physical devices. For example, the operator can start or stop virtual machines, move virtual machines between physical devices, and add or remove physical devices from the cluster. In response to manipulation by the operator, the operator console presents a result of that manipulation, such as showing the status of virtual machines, the assignment of virtual machines to physical devices, and the status of physical devices.

In one embodiment, the operator can create a new virtual machine, or can restart a paused or stopped virtual machine. The operator console determines a best physical device to host the new virtual machine, assigns the new virtual machine to that selected physical device, and starts or restarts the new virtual machine on the selected physical device. The operator console need not request substantial operator decision-making or intervention. The operator console is capable of making the determination of the best such physical device, and of starting or restarting the virtual machine on that physical device, without the operator.

After reading this application, those skilled in the art would recognize that techniques shown in this application are applicable to fields and information other than those fields specifically described herein. In the context of the invention, there is no particular requirement for any such limitation.

Moreover, after reading this application, those skilled in the art would recognize that techniques shown in this application are applicable to methods and systems other than those involving portable operating environments. In the context of the invention, there is no particular requirement for any such limitation. For example, other contexts can include frequent or important access to secured data, such as data that is otherwise hardware-protected, software-protected, or protected by use of a proprietary data format.

After reading this application, which shows and describes illustrative embodiments of the disclosure, other and further embodiments of the present disclosure will become apparent to those skilled in the art. As will be realized, the various embodiments of the present disclosure are capable of modifications in various obvious aspects, all without departing from the scope and spirit of the present disclosure. The drawings and detailed description are intended to be illustrative in nature and not restrictive in any way.

DETAILED DESCRIPTION

Example Graphical Interface

Figure 1:
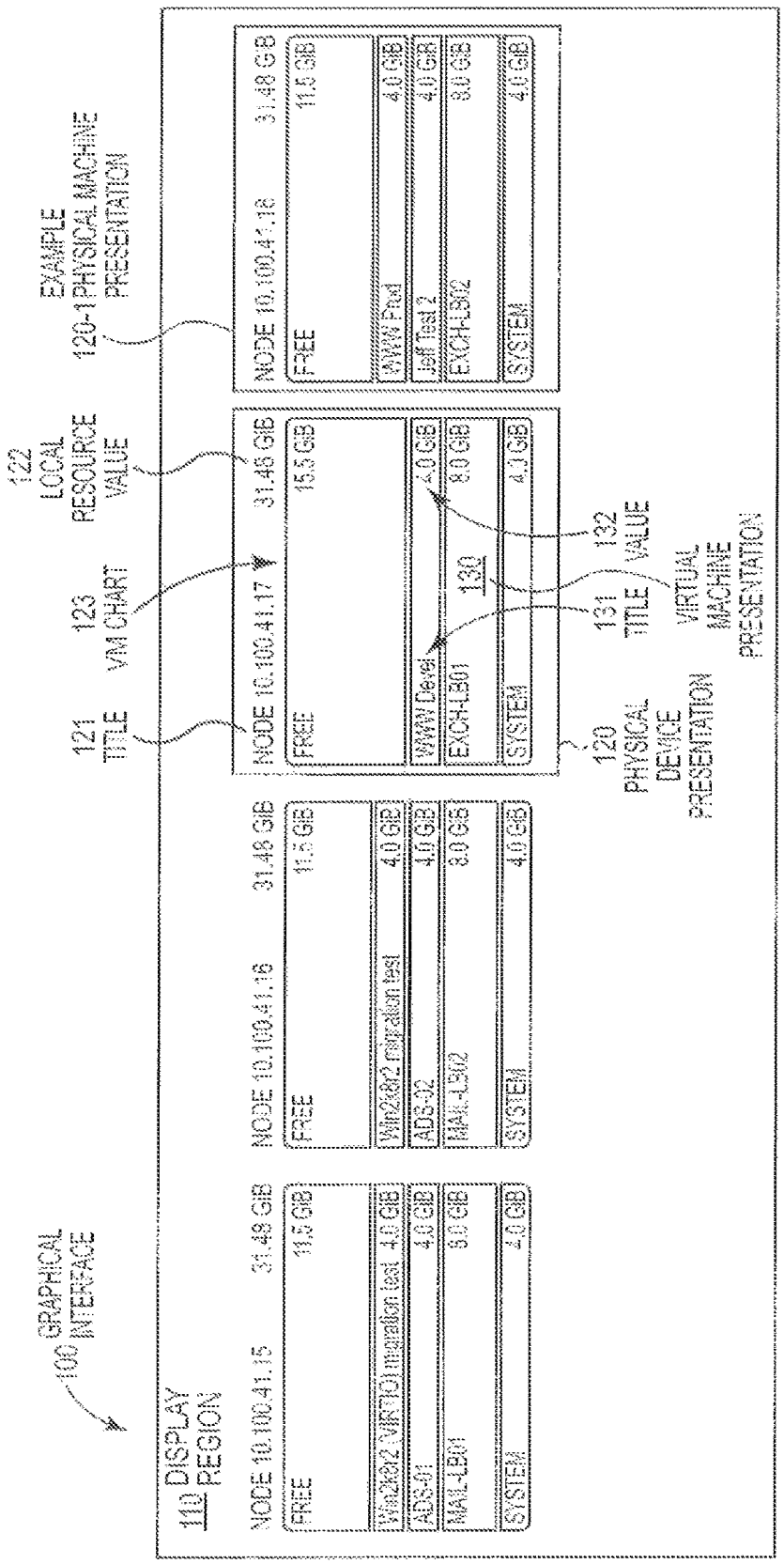
FIG. 1 shows a conceptual drawing of a graphical interface.

FIG. 1 shows a conceptual drawing of a graphical interface.

In one embodiment, a graphical interface 100 can include a presentation of a display region no, one or more selected physical device presentations 120 (each having an associated physical device), each showing one or more virtual machine presentations 130 (each having an associated virtual machine).

In one embodiment, the graphical interface 100 can include elements and features as described with respect to the Incorporated Disclosures, such as including U.S. Provisional Patent Application 61/692,660, filed Aug. 23, 2012, titled "Virtual machine resource display".

Physical Device Presentations

In one embodiment, each physical device presentation 120 includes a separate presentation region, including a title 121, a local resource value 122, a virtual machine chart 123, and possibly other elements.

While this application primarily describes a system that assigns each physical device presentation 120 a separate presentation region, in the context of the invention, there is no particular requirement for any such limitation. For example, in some cases, more than one physical device presentation 120 can be combined into a collective presentation region. In a first such case, this might occur if there are a relatively large number of physical devices for which physical device presentations 120 are needed. In a second such case, this might occur if the physical devices had heterogeneous characteristics, and it is desirable to combine physical device presentations 120 for those physical devices having similar characteristics.

In one embodiment, the title 121 includes a character string naming the physical device associated with the physical device presentation 120, such as an IP address. However, in the context of the invention, there is no particular requirement for any such limitation. For example, the title 121 can include any other name for, or other character string associated with, the physical device associated with the physical device presentation 120. While the figure shows each physical device presentation 120 with a unique title 121, in the context of the invention, there is no particular requirement for any such limitation. For example, more than one physical device presentation 120 can have similar or identical names (in response to the possibility that more than one physical device can have similar or identical names).

In one embodiment, the local resource value 122 is responsive to a total amount of local resources. However, in the context of the invention, there is no particular requirement for any such limitation. For example, the local resource value 122 can include an amount of local resources currently in use, an amount of local resources remaining, or some other value.

In one embodiment, the local resource value 122 includes a value responsive to a single resource, such as an amount of memory, an amount of network bandwidth, an amount of processor usage, or otherwise. However, in the context of the invention, there is no particular requirement for any such limitation.

For a first example, the local resource value 122 can include a fraction of that resource that is free, or that is in use.

For a second example, the local resource value 122 can include a maxi-mum or minimum, or other statistical value, with respect to allocation or usage of a particular resource.

For a third example, the local resource value 122 can include a value responsive to a formula with respect to allocation or usage of more than one resource. In one such case, a formula can be a static formula set by a designer, an operator, or a user. In another such case, a formula can be a dynamic formula responsive to usage, responsive to machine learning, or otherwise.

In one embodiment, the virtual machine chart 123 includes a region such as a rectilinear shape, which shows assignments of virtual machines to physical devices. In alternative embodiments, the virtual machine chart 123 can have a different shape, such as a pie chart, and need not have the same shape (or size) for each physical device presentation 120. For example, in one alternative embodiment, each physical device presentation 120 can include a virtual machine chart 123 size is responsive to an amount of allocable resources available to the physical device associated with that physical device presentation 120. In one such case, two physical device presentations 120 with differing allocable resources would be presented with virtual machine chart 123 with differing sizes.

In one embodiment, the virtual machine chart 123 includes one or more virtual machine presentations 130, each one showing information about an associated virtual machine. For example, the virtual machine chart 123 for an example physical device presentation 120-1 can include a virtual machine presentation 130 for a first virtual machine titled "SYSTEM", a second virtual machine titled "EXCH-LB02", a third virtual machine titled "Jeff Test 2", a fourth virtual machine titled "WWW Prod", and a reserved space for unallocated resources (titled "FREE").

In one embodiment, the virtual machine presentations 130 can include, in addition to text, other information indicating the nature of the associated virtual machine, or of the resource use associated with that virtual machine. For example, the virtual machine presentations 130 can include color, highlighting, texture, or other aspects capable of being sensed by one or more operators (such as blinking, boldface text, italic text, or otherwise).

In one such case, a virtual machine presentation 130 for a virtual machine designated to operate the physical device (such as titled "SYSTEM") can include striping or another indicator to show that its associated virtual machine cannot readily be removed or reduced in size.

In another such case, a virtual machine presentation 130 for the reserved space for unallocated resources (such as titled "FREE") can include a blank color or another indicator to show that there is no such associated virtual machine and that the associated resources are so far unallocated.

In one embodiment, the virtual machine presentations 130 can be separated by a line or other indicator, to make reading the virtual machine chart 123 more convenient, to make selection of one or more virtual machine presentations 130 more readily convenient, or otherwise.

Virtual Machine Presentations.

In one embodiment, each virtual machine presentation 130 includes a title 131 and a virtual machine resource value 132, and possibly other elements.

Similar to the title 121 associated with the physical device presentation 120, the title 131 includes a character string naming the virtual machine associated with the virtual machine presentation 130. As described above, some character strings can be reserved as a special indicators, such as the terms "SYSTEM" and "FREE".

Similar to the local resource value 122 associated with the physical device presentation 120, the virtual machine resource value 132 includes a value responsive to a single resource, such as an amount of memory, an amount of network bandwidth, an amount of processor usage, or otherwise. For example, the virtual machine resource value 132 can include a value similar to any of the values described above with respect to the local resource value 122.

Interaction with Interface.

In one embodiment, the operator can interact with the graphical interface 100, such as by selecting one or more physical device presentations 120, one or more virtual machine presentations 130, or otherwise. For example, the operator can select one or more physical device presentations 120 to indicate selection of associated physical devices, can select one or more virtual machine presentations 130 can indicate selection of associated virtual machines (or free space), or can select some other element.

In one embodiment, the operator can direct the cluster to add or remove one or more physical devices. In response thereto, the graphical interface 100 adds or removes associated physical device presentations 120. For a first example, the operator can select one or more physical device presentations 120, and direct the graphical interface 100 to remove the associated physical devices. For a second example, the operator can select one or more physical device presentations 120, and direct the cluster to resize the associated physical devices, such as by adjusting a size of those physical device presentations 120. Thereafter, the cluster would treat those associated physical devices as having new sizes, as specified by the operator.

In one embodiment, the operator can direct the cluster to add or remove one or more virtual machines to selected physical devices. In response thereto, the graphical interface 10*o* adds or removes associated virtual machine presentations 130*o*. For a first example, the operator can select one or more virtual machine presentations 130, and direct the graphical interface 10*o* to remove the associated virtual machines from their physical devices. For a second example, the operator can select one or more virtual machine presentations 130, and direct the graphical interface too to resize the associated virtual machines, such as by adjusting a border between two virtual machine presentations 130, or between a virtual machine presentation 130 and free space. Thereafter, the cluster would treat those associated virtual machines as having new sizes, as specified by the operator, and would adjust an amount of free space available on their physical devices (and adjust their physical device presentations 120).

In one embodiment, the operator can direct the cluster to move or copy one or more virtual machines between selected physical devices. In response thereto, the graphical interface too moves associated virtual machine presentations 130 between selected physical device presentations 120. For a first example, the operator can select one or more virtual machine presentations 130, and drag those virtual machine presentations 130 between selected physical device presentations 120. Thereafter, the cluster would remove those associated virtual machines from the source physical devices, restart them on the destination physical devices, as specified by the operator, and would adjust an amount of free space available on the source and destination physical devices (and adjust their physical device presentations 120).

In one embodiment, the operator can direct the cluster to rebalance load between selected physical devices, such as with respect to selected virtual machines. In response thereto, the graphical interface 100 computes a rebalanced loading of those physical devices with those virtual machines. Having done so, the cluster removes those associated virtual machines from the computed source physical devices, restarts them on the computed destination physical devices, as determined by the rebalanced loading, and would adjust the amount of free space available on the source and destination physical devices (and adjust their physical device presentations 120).

In one embodiment, the operator can direct the cluster to perform one or more such operations multiple times, such as by selecting multiple physical device presentations 120 or multiple virtual machine presentations 130.

For a first example, the operator can concurrently adjust the size of multiple physical devices. Similarly, the operator can concurrently remove multiple physical devices, or add multiple copies of a new physical device.

For a second example, the operator can concurrently adjust the size of multiple virtual machines. Similarly, the operator can concurrently remove multiple virtual machines, or add multiple copies of a new virtual machine.

For a third example, the operator can concurrently move multiple virtual machines between physical devices.

For a fourth example, the operator can concurrently copy virtual machines from one or more source physical devices to multiple destination physical places. This can have the effect of selecting one or more virtual machines, and making multiple copies thereof at selected destination physical devices.

After reading this application, the those skilled in the art will recognize that many other such examples are possible, are within the scope and spirit of the invention, and would be workable, without any requirement for new invention or further experiment.

Further Graphical Interface

Figure 2A:
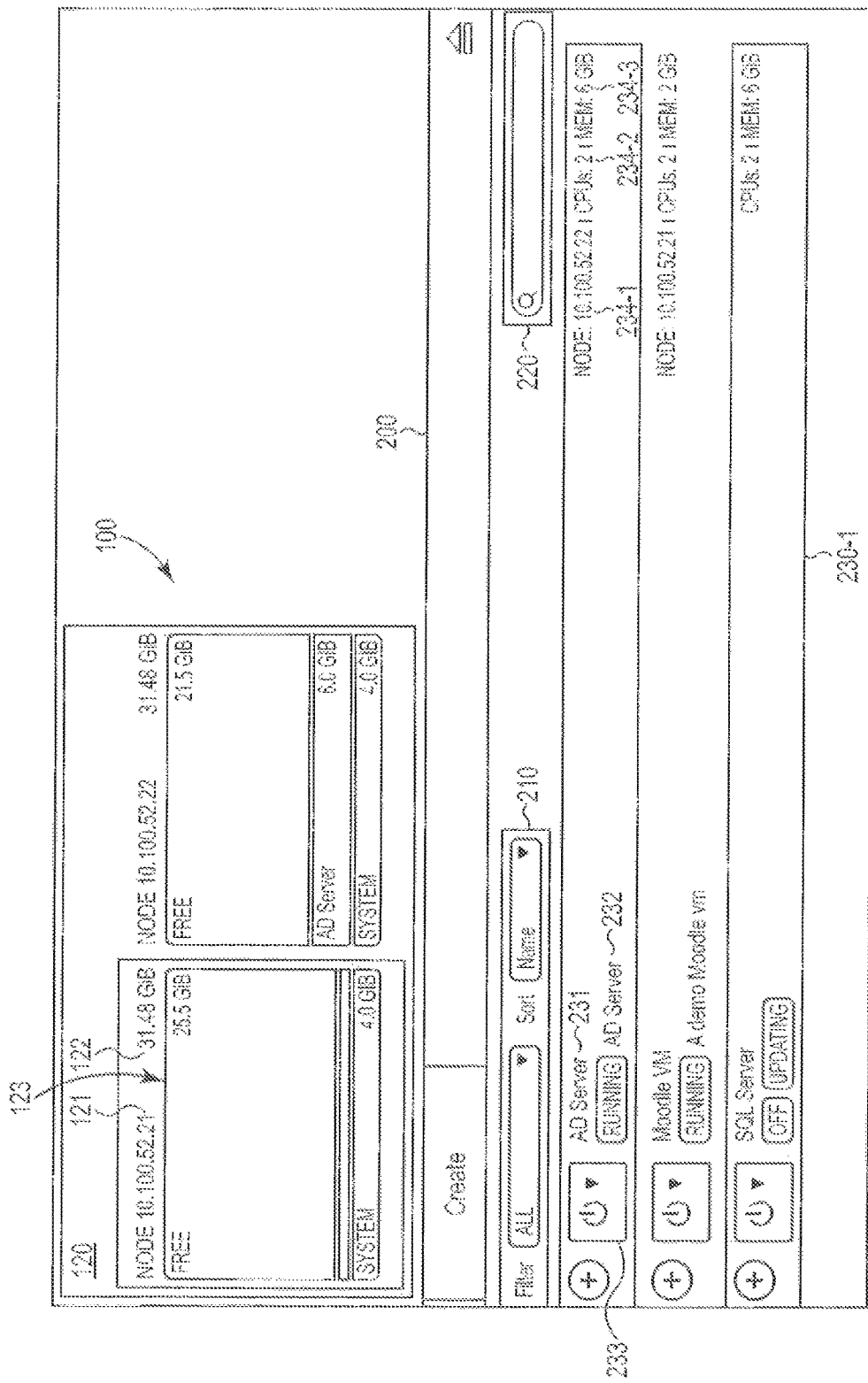
FIG. 2A shows a conceptual drawing of a graphical interface.

FIG. 2A shows a conceptual drawing of a graphical interface.

Figure 2B:
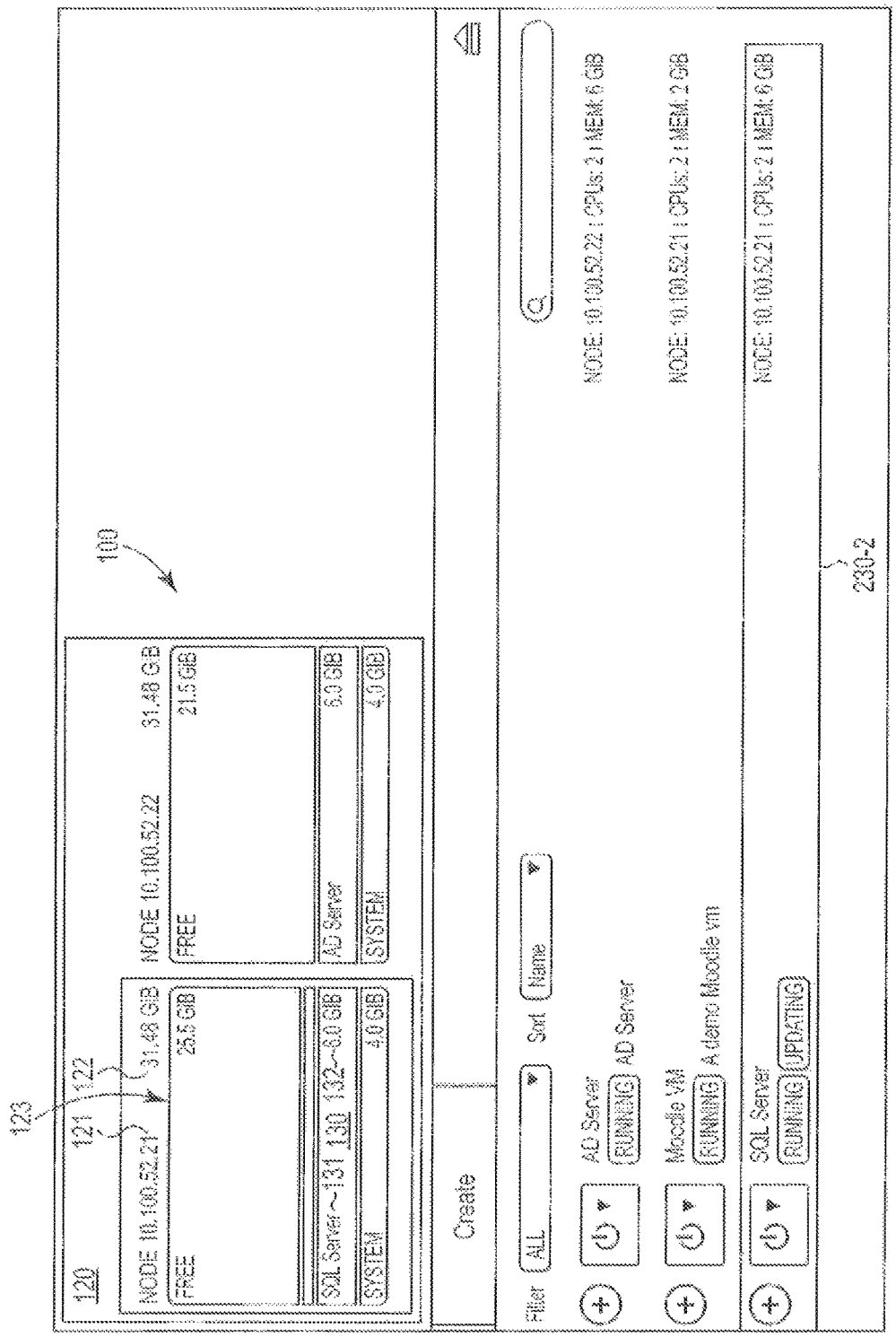
FIG. 2B shows a conceptual drawing of a graphical interface

FIG. 2B shows a conceptual drawing of a graphical interface.

In one embodiment, the graphical interface 100 includes elements as shown in the FIG. 2A and the FIG. 2B, including an control panel 200, which includes a selection element 210, a search element 220, a set of virtual machine detail elements 230, and possibly other elements.

Selection and Search.

In one embodiment, the selection element 210 includes a filter control 211 and a sort control 212. The filter control 211 is responsive to the operator of the cluster, and can include an input to one or more filter software elements (not shown) capable of selecting a subset of virtual machines according to one or more filters selected or specified by the operator. For example, the operator could use the filter control 211 to direct the filter software elements to select only those virtual machines that are using more than 8 GiB of allocated memory, or only those virtual machines that are executing a Windows™ guest operating system, or only those virtual machines that have failed to respond to a network request for more than 10 seconds, or some combination or conjunction thereof, or otherwise.

Similarly, the sort control 212 is responsive to the operator of the cluster, and can include an input to one or more sort software elements (not shown) capable of selecting an order for presentation of virtual machines according to one or more sort criteria selected or specified by the operator. For example, the operator could use the sort control 212 to direct the sort software elements to order the presentation of virtual machines alphabetically by title, numerically by IP address, numerically by amount of allocated memory, grouped by guest operating system, or some combination or conjunction thereof, or otherwise.

Similarly, the search element 220 is responsive to the operator of the cluster, and can include an input to one or more search software elements (not shown) capable of finding one or more virtual machines according to one or more search criteria selected or specified by the operator. For example, the operator could use the search control 220 to direct the search software elements to find those virtual machines that were created during a specified time period, that are within a specified IP subnet, that are allocated more than a specified amount of memory, that are using a specified guest operating system, or some combination or conjunction thereof, or otherwise.

Virtual Machine Detail.

In one embodiment, the virtual machine detail elements 230 each present information to the operator with respect to one or more particular virtual machines. For example, an example virtual machine detail element 230-1 can present information to the operator with respect to a virtual machine titled "SQL Server", which is shown in the FIG. 2A as off and having a status of "updating". While this application primarily describes an control panel 200 that presents a separate virtual machine detail element 230 for each individual virtual machine, in the context of the invention, there is no particular requirement for any such limitation. For example, one or more virtual machines could be grouped together (such as, all virtual machines using a Windows™ guest operating system) and presented using a collective virtual machine detail element 230 for that group.

In one embodiment, each virtual machine detail element 230 can include a title 231, a descriptive string 232, a selection element 233, and one or more resource descriptors 236. For example, the resource descriptors 234 can include an IP address resource descriptor 234-1, a CPU count resource descriptors 234-2, an allocated memory resource descriptor 234-3, and otherwise. In one such case, as shown in the FIG. 2A, the example virtual machine detail element 230-1 can show that its associated virtual machine would be allocated 2 CPUs and 6 GiB of memory if it were started.

As described above with respect to the FIG. 1, information about each virtual machine currently executing is presented to the operator using its virtual machine presentation 130. As shown with respect to the FIG. 2A, since the virtual machine ("SQL Server") associated with the example virtual machine detail element 230-1 is not currently being executed, there is no virtual machine presentation 130 associated with that virtual machine, and no resources allocated for that virtual machine on any physical device.

In one embodiment, the title 231 includes a name for the virtual machine associated with the virtual machine detail element 230, similar to the title 131 described with respect to the FIG. 1. For example, in the example virtual machine detail element 230-1, the title 231 includes the name "SQL Server".

In one embodiment, the descriptive string 232 includes a further descriptive string for the virtual machine associated with the virtual machine detail element 230, such as an expanded description for use by the operator. For example, in the example virtual machine detail element 230-1, the descriptive string 232 could include further information such as the implementation and version number of the SQL Server. At a related location in the control panel 200, the example virtual machine detail element 230-1 shows that the associated virtual machine is off, and in the "updating" state.

In one embodiment, the selection element 233 indicates a control by which the operator can select (or deselect) the virtual machine associated with the virtual machine detail element 230. For example, the selection element 233 can allow the operator to request further detail about the virtual machine associated with the virtual machine detail element 230.

In one embodiment, the resource descriptors 234 indicates further information about the virtual machine associated with the virtual machine detail element 230. For example, in the example virtual machine detail element 230-1, the resource descriptors 234 indicates information about the virtual machine associated with the example virtual machine detail element 230-1. The IP address resource descriptor 234-1 is blank, since the virtual machine is not started and thus has no IP address. The CPU count resource descriptor 234-2 indicates that the associated virtual machine would have 2 CPUs, when started. The allocated memory resource descriptor 234-3 indicates that the associated virtual machine would have 6 GiB, when started.

Virtual Machine Automated Selection.

In one embodiment, the operator can select a virtual machine detail element 230 and direct the associated virtual machine to be started (or restarted, if it had been paused or halted). The control panel 200 receives the instruction from the operator and directs a request to one or more "SYSTEM" virtual machines on physical devices in the cluster (not shown). The "SYSTEM" virtual machines are disposed to receive such requests and to respond to the control panel 200. The control panel 200 presents a result of the response to the operator.

In one embodiment, the "SYSTEM" virtual machines (not shown) can include elements and features as described with respect to the Incorporated Disclosures, such as including U.S. Provisional Patent Application 61/651,391, filed May 24, 2012, titled "Unified hypervisor and distributed fault-tolerant storage". In such cases, the "SYSTEM" virtual machines can include operating system software (not shown) that shares memory with each other, and that maintains a common set resources available in the cluster. For example, "SYSTEM" virtual machines can maintain a common set of redundant shared disk drives, with the effect of maintaining a redundant set of resources available to virtual machines in the cluster.

In one embodiment, the operating system software executing on the "SYSTEM" virtual machines can include a selection element (not shown), that can review the cluster as a unified set of shared resources, can select a "best" individual physical device on which to start the virtual machine, and can start that virtual machine on the selected individual physical device.

FIG. 2B shows a result of the operator selecting the example virtual machine detail element 230-1 for automated selection. The FIG. 2B shows the associated virtual machine with respect to example virtual machine detail element 230-2, which presents the virtual machine as running and having a status of "updating". Similarly, the resource descriptor 234-1 for the example virtual machine detail element 230-2 presents the virtual machine as having been assigned an IP address, a consequence of being coupled to a network, itself a consequence of being in a running state.

ALTERNATIVE EMBODIMENTS

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A method, including steps of
in response to status information describing ability to execute virtual machines from each one of a cluster of intercommunicating physical devices, maintaining a distributed fault tolerant file system;
wherein each of the physical devices is disposed to intermittently and autonomously directly report said status information to each other physical device;
wherein each of the physical devices is disposed to maintain a separate hypervisor manager, each separate hypervisor manager being disposed to control virtual machines to cause a first one of those virtual machines to communicate with one or more second virtual machines both on the same physical device and on each other physical device;
wherein each of the physical devices is disposed to maintain a separate set of storage units, and is disposed to access storage blocks both on the same physical device and on each other physical device, wherein the physical devices are disposed to collectively maintain each storage block on at least a first storage unit at a first physical device, and on at least a separate second storage unit at a separate second physical device;
wherein the physical devices are collectively disposed to continuously maintain a unified pool of storage blocks providing fault tolerance against data loss, wherein each first physical device accesses storage blocks maintained in the unified pool at a separate second physical device directly by a private network switch accessible only to the cluster of intercommunicating physical devices without intermediate operation of a separate processor; and
in response to a control signal from an operator with respect to a new virtual machine, operating a console coupled to said cluster to select from the cluster a particular physical device to host said new virtual machine, to assign said new virtual machine to said particular physical device, and to start said new virtual machine on said particular physical device without substantial operator decision-making or intervention.

2. A method as in claim 1, wherein
said new virtual machine includes one or more of: a restarted virtual machine, a transferred virtual machine.

3. A method as in claim 1, wherein
said resources include one or more of:
an amount of physical memory assigned to each of those virtual machines;
an amount of processing power assigned to each of those virtual machines;
an amount of network access assigned to each of those virtual machines.

4. A method as in claim 1, including steps of
directly exchanging one or more storage blocks from a first physical device to a second physical device, wherein the storage blocks are directly accessible by the first physical device and the second physical device without intermediate operation of a separate device.

5. A method as in claim 1, wherein
said new virtual machine comprises a restarted virtual machine that had been stopped.

6. Apparatus including
a cluster of intercommunicating physical devices maintaining a distributed fault tolerant file system, each of the physical devices disposed to send status information describing that physical device's ability to execute virtual machines;
wherein each of the physical devices is disposed to intermittently and autonomously directly report said status information to each other physical device;
wherein each of the physical devices includes a separate hypervisor manager, each separate hypervisor manager being disposed to control virtual machines to cause a first one of those virtual machines to communicate with one or more second virtual machines both on the same physical device and on each other physical device;
wherein each of the physical devices includes a separate set of storage units, and is disposed to access storage blocks both on the same physical device and on each other physical device, wherein the physical devices are disposed to collectively maintain each storage block on at least a first storage unit at a first physical device, and on at least a separate second storage unit at a separate second physical device;
wherein the distributed fault tolerant file system collectively includes a unified pool of storage blocks providing fault tolerance against data loss, wherein each first physical device is disposed to access storage blocks maintained in the unified pool at a separate second physical device directly by a private network switch accessible only to the cluster of intercommunicating physical devices without intermediate operation of a separate processor, to receive said status information from each other one of said physical devices; and
an operator console coupled to said cluster, said operator console including instructions interpretable by a computing device, said instructions being interpretable by said computing device
to select from the cluster, a particular physical device to host a new virtual machine,
to assign said new virtual machine to said particular physical device, and
to start said new virtual machine on said particular physical device without substantial operator decision-making or intervention.

7. Apparatus as in claim 6, wherein
said new virtual machine includes one or more of: a restarted virtual machine, a transferred virtual machine.

8. Apparatus as in claim 6, wherein
said resources include one or more of:
an amount of physical memory assigned to each of those virtual machines;
an amount of processing power assigned to each of those virtual machines; an amount of network access assigned to each of those virtual machines.

9. Apparatus as in claim 6, including
an interconnect between a plurality of the physical devices,
wherein a first particular physical device can exchange one or more storage blocks with a second particular physical device,
wherein the storage blocks are directly accessible by the first physical device and the second physical device without intermediate operation of a separate device.

10. Apparatus as in claim 6, wherein
said new virtual machine comprises a restarted virtual machine that had been stopped.

11. A method, including steps of
among a cluster of intercommunicating physical devices maintaining a distributed fault tolerant file system,
wherein each of the physical devices is disposed to maintain a separate set of storage units, and is disposed to access storage blocks both on the same physical device and on each other physical device, wherein the physical devices are disposed to collectively maintain each storage block on at least a first storage unit at a first physical device, and on at least a separate second storage unit at a separate second physical device;
wherein the physical devices are collectively disposed to continuously maintain a unified pool of storage blocks providing fault tolerance against data loss, wherein each first physical device accesses storage blocks maintained in the unified pool at a separate second physical device directly by a private network switch accessible only to the cluster of intercommunicating physical devices without intermediate operation of a separate processor;
wherein each of the physical devices is disposed to, at least at some times intermittently, and at least for some of the physical devices autonomously, each first one of the devices both sending and receiving said status information directly to a second one of devices to each other physical device;
wherein each of the physical devices is disposed to maintain a separate hypervisor manager, each separate hypervisor manager being disposed to control virtual machines to cause a first one of those virtual machines to communicate with one or more second virtual machines both on the same physical device and on each other physical device;
in response to a control signal from an operator with respect to a new virtual machine, operating a console coupled to said cluster to select from the cluster, a particular physical device to host said new virtual machine, to assign said new virtual machine to said particular physical device, and to start said new virtual machine on said particular physical device without substantial operator decision-making or intervention;
presenting to the operator with respect to the new virtual machine, a display on the console coupled to the cluster, the display indicating to which physical device the new virtual machine has been assigned.

12. A method Apparatus as in claim 11, wherein
the display indicates one or more of: a location of a restarted virtual machine, removal of a transferred virtual machine from a first location and addition of the transferred virtual machine to a second location.

13. A method Apparatus as in claim 11, wherein
said display indicates one or more of: a set of virtual machines assigned to physical devices by the physical devices in the cluster, in response to a request from an operator to rebalance those virtual machines.

14. A method as in claim 11, including steps of
directly exchanging one or more storage blocks from a first physical device to a second physical device, wherein the storage blocks are directly accessible by the first physical device and the second physical device without intermediate operation of a separate device.

15. A method as in claim 11, wherein
said new virtual machine comprises a restarted virtual machine that had been stopped.

* * * * *